(No Model.) 2 Sheets—Sheet 1.
T. W. HEERMANS.
POWER TRANSMITTING DEVICE.
No. 532,237. Patented Jan. 8, 1895.
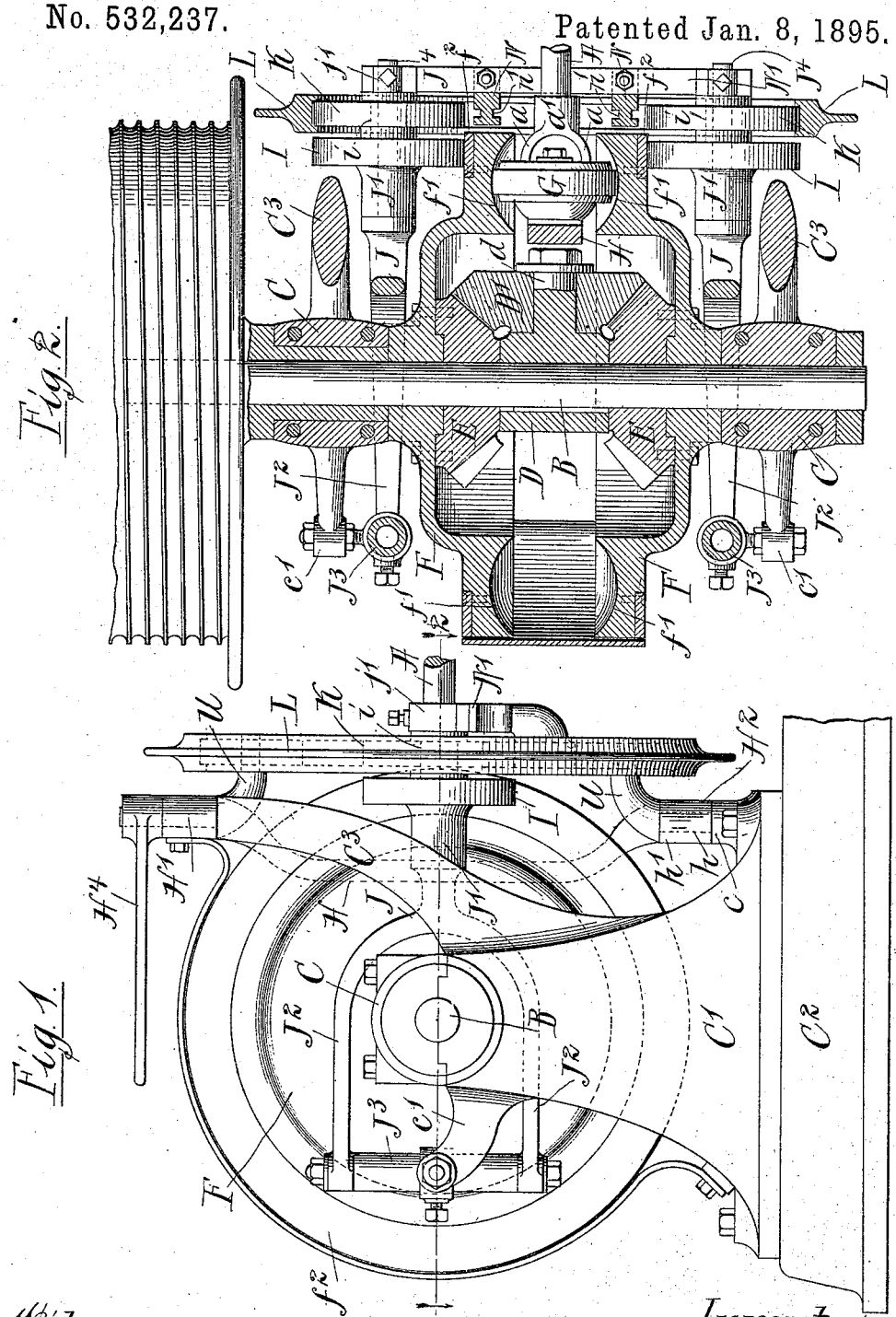
Witnesses:—
Jno. W. Adams
Clinton Hamlink
Inventor:—
Thaddeus W. Heermans
by:— Dayton Poole & Brown
his Attorneys

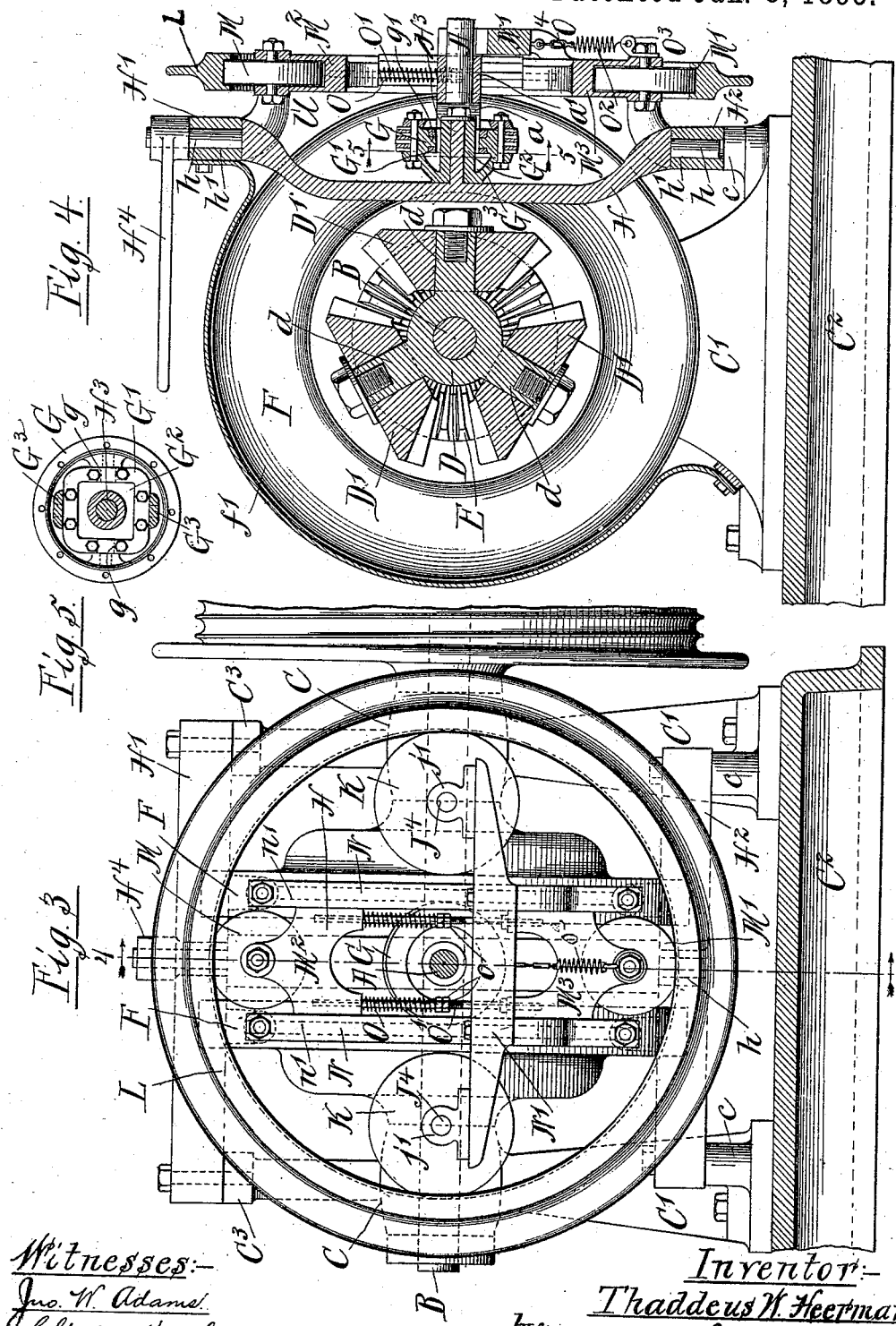

UNITED STATES PATENT OFFICE.

THADDEUS W. HEERMANS, OF CHICAGO, ILLINOIS.

POWER-TRANSMITTING DEVICE.

SPECIFICATION forming part of Letters Patent No. 532,237, dated January 8, 1895.

Application filed June 20, 1894. Serial No. 515,183. (No model.)

*To all whom it may concern:*

Be it known that I, THADDEUS W. HEERMANS, of Chicago, in the county of Cook and State of Illinois, have invented certain new and useful Improvements in Power-Transmitting Devices; and I do hereby declare that the following is a full, clear, and exact description thereof, reference being had to the accompanying drawings, and to the letters of reference marked thereon, which form a part of this specification.

This invention relates to devices for transmitting motion of that class employed for increasing or decreasing the speed of working parts and the direction of motion of the same without changing the speed or direction of motion in the prime mover or power shaft from which the motion is derived.

The invention relates more especially to that class of such devices which embraces surfaces in frictional contact as a means of communicating motion from the driving shaft to the shaft to be driven.

The invention consists in the matters hereinafter described and pointed out in the appended claims.

In the accompanying drawings illustrating my invention:—Figure 1 is a view on side elevation of an apparatus embodying my invention. Fig. 2 is a plan section taken on line 2—2 of Fig. 1. Fig. 3 is a front elevation of the same. Fig. 4 is a vertical section taken on line 4—4 of Fig. 3. Fig. 5 is a detail section in line 5—5 of Fig. 4.

As illustrated in said drawings A indicates the driving shaft from which the power is derived. This may be the armature shaft of an electric motor or other power driven shaft.

B indicates the shaft to be driven, or the shaft through which motion is transmitted to the working parts to be actuated. A winding drum or windlass is shown in the drawings as applied to said shaft for the purpose of illustrating one way in which the power transmitting devices illustrated may be usefully applied. Said shaft B is shown as mounted in horizontal bearing boxes C C, located near opposite ends of the shaft, and supported by standards C' C' from a horizontal base casting $C^2$. The shaft B is shown as located at right angles to, and in the same horizontal plane with, the power shaft A. On the shaft B, centrally between the bearings C C, is mounted a sleeve D which is keyed or otherwise rigidly secured to the shaft, and is provided with one or more radial studs $d$ carrying one or more beveled gears D' D'.

E E are two miter wheels which are mounted on the shaft B at either side of the sleeve D and which intermesh with the gears D' D' and F F are friction pulleys also mounted on said shaft B, the centers or hubs of said pulleys being located between the miter gears E E and the bearings C. The miter gears E E and friction pulleys F F are rigidly attached to each other and turn together. These parts, under some circumstances, may be cast integral with each other, but for convenience of construction will commonly be made separate and bolted or otherwise secured together, as shown. The friction pulleys F F are made considerably larger in diameter than the gears E E, and, outside of said gears, are provided on their adjacent faces with opposing annular concave friction surfaces $f'$ $f'$, conforming in cross-sectional shape to a circle, the center of which is located midway between the adjacent faces of the friction pulleys F F.

G is a friction driving pulley which is located between the opposing friction surfaces $f'$ $f'$ of the pulleys F F and is connected with the power shaft A by suitable driving connections, permitting movement of the pulley relatively to the shaft. This pulley is pivotally supported in such manner that it is adapted to rotate about an axis passing diametrically through it, and which passes through the center of a circle passing through the opposing concave friction surfaces $f'$ $f'$, so that when the friction pulley G is turned about said axis of rotation it will retain opposite peripheral contact with said friction surfaces.

The driving pulley G when resting at right angles to the power shaft A and when driven thereby will have opposite peripheral engagement with said contact surfaces at points equi-distant from the axis of rotation of the friction pulleys, so that said pulleys will be driven by said pulley at equal speeds, but in opposite directions. When said driving pulley is turned on its transverse axis of rotation, as above described, its point of contact with one of the friction pulleys will move outwardly, or away from the center of the same, while its point of contact with the other friction pulley will move inwardly toward the center of the same, so that the speed of one pulley will be diminished and that of the other increased. The form of support employed for so sustaining the pulley G as to permit the movement described consists, as herein shown, of a yoke piece H which is arranged in an upright position and extends between the friction pulleys F F, said yoke piece being provided at its ends with journals or trunnions $h\ h$ which engage stationary bearings $h'\ h'$ above and below the friction pulleys, said journals being arranged in alignment with the central diametrical axis of the pulley G, so that when said yoke H is turned or oscillated the pulley G will be turned or rotated about said diametrical axis. The pulley G is mounted on the yoke H by means of a rigid bearing pin or stud $H^3$ which is secured to the yoke at right angles to the axis of oscillation of the same and on which the said pulley is mounted. A hand lever $H^4$ attached to one of the journals of said yoke H enables the said yoke to be swung or oscillated and the pulley G to be thereby turned about its diametrical axis of rotation, in the manner hereinbefore referred to. The bearings $h'\ h'$ of the yoke H are herein shown as formed in transverse horizontal girts or frame-pieces $H'\ H^2$, the upper one $H'$ of which is sustained by brackets $C^3\ C^3$ which rise from the bearings C C, and the lower one $H^2$ of which is supported by short posts $c\ c$ on the base of the standards $C'\ C'$.

To afford driving connection between the shaft A and the pulley G, I have provided, in the device shown in the drawings a universal or gimbal joint, which is constructed as follows: Said pulley G is made of annular form to provide a space within it for the parts of the universal joint. The latter consists of a ring $G'$ connected with the arm of the pulley by inwardly projecting radial studs $g'\ g'$ and with arms $a\ a$ attached to a hub $a'$ on the shaft A by means of similar studs $g\ g$ arranged at right angles to the studs $g'\ g'$, said several pivot studs being arranged in a plane passing through the center of the pulley G, in the manner illustrated. The ring $G'$ is shown as made in two parts, separated on a plane parallel with its side face and connected by screws or bolts. The bearings for said studs are formed by opposite recesses in the adjacent faces of said parts of the ring, and the ring is disconnected from the studs by separating the parts of the ring. Said pulley G is shown as provided with a central hub $G^2$ which is provided with a bearing aperture to receive the said stud $H^3$, the rim of the pulley being connected with the said hub $G^2$ by a web or flange $G^3$, in the manner illustrated. The universal or gimbal joint described obviously enables rotary motion to be constantly transmitted from the power shaft A to the pulley G, notwithstanding changes in the position of said pulley caused by shifting or oscillation of the yoke H.

The rim of the driving pulley is shown as made of two parts connected by bolts, and so shaped as to receive a series of rings or layers of leather, or other suitable material, which forms the friction surface of the pulley.

The principal parts above described, to-wit: the bevel gears $D'$ carried by the shaft B, and having their axes of rotation radial to said shaft, the bevel gears E E, the friction pulleys F F connected with the said bevel gears so as to drive the latter, and the friction driving pulley, adapted to be moved about an axis at right angles to its axis of rotation, and which is actuated by suitable driving connections with the power shaft, constitute the main or principle operative elements of the device illustrated. In the operation of these parts, rotation of the shaft B arises solely from difference of speed in the friction pulleys F F, and the direction of motion of said shaft B depends upon which one of said pulleys is driven faster or slower than the other. It is obvious, for instance, that if the pulley G be allowed to remain in its central position and with its points of peripheral contact with the two friction pulleys at an equal distance from the center of said pulleys, the latter pulleys will be revolved in opposite directions and at the same speed, with the result merely that the beveled gears E E will give rotary motion to the pinions $D'\ D'$ without producing any bodily movement in the latter and without turning or moving the shaft B. If, however, the driving pulley be turned or rotated on its diametrical axis its point of contact with one of the friction pulleys F F will be moved outwardly, and its point of contact with the other pulley will be moved inwardly, so that one pulley will be turned faster than the other, and bodily movement will then be given to the gear pinions $D'$ and the shaft B will be rotated at a degree of speed depending on the difference of speed between the two pulleys F F. Moreover, the direction of motion of the shaft B will depend on the direction in which the driving pulley G is turned about its diametrical axis; it being obvious that the beveled gears $D'$ will be revolved or turned bodily in the direction in which that one of the pulleys F which is moving most rapidly may be turning. By manipulation of hand lever $H^4$, therefore, the driving shaft B may be turned at a desired speed either backward or forward, so that a simple and convenient form of speed changing and reversing mechanism is provided.

In addition to the main features of my invention referred to, the invention also embraces improved devices for maintaining the friction pulleys in contact with the driving pulley, or in other words, for preventing said friction pulleys from spreading apart under the pressure of the driving pulley, said devices being made as follows:

I I are two backing rollers which are arranged opposite the driving pulley G, and which are run in contact with the outer surfaces of the driving pulleys, which latter are herein shown as provided with bearing rings $f^2 f^2$ to take the pressure and wear occasioned by the action of the backing pulleys. Said backing pulleys are mounted on swinging frames J J, herein shown as consisting of central hubs J' J' provided with vertically separated arms $J^2 J^2$ which reach past the shaft bearings C C above and below the same and have pivotal connection with the frame of the device by means permitting lateral oscillation of the free ends of the frame in a horizontal plane. The form of pivotal support shown consists of an upright shaft $J^3$ to the upper and lower ends of which the said arms $J^2 J^2$ are pivoted by means of set screws in the ends of the arm having conical bearing ends which engage sockets in the ends of said shaft, which latter is supported by means of a lateral projecting screw threaded stud which passes through a bracket c' on the bearing C, and is held therein by nuts on opposite sides of said bracket. This construction obviously allows the forward ends of the frames J J and the backing rollers thereon to move toward and from the driving pulley G. The frames J J are sustained at their forward or free ends by means of a horizontally arranged supporting bar N', which is supported by attachment to vertical, parallel bars N N, which are sustained by attachment at their upper and lower ends to brackets U U, which extend outwardly from the cross-bars H' H', by which the yoke H is pivotally supported. Said bars N N serve also to support other parts, hereinafter described. The said frames are supported on the bar N' so as to move or slide laterally at their free ends, thereon, by means of bearing blocks j' j' which are provided with bearing apertures receiving the ends of the bearing pins $J^4 J^4$ and which are provided with flat bearing surfaces resting on the flat top surface of the said bar N'. The hub $J^2$ is provided with a forwardly extending journal or bearing pin $J^4$ on which the backing roller I is mounted. Said frames J J also carry two antifriction rollers K K which are mounted on sleeves i i, which are attached to and turn with the rollers I I, said rollers K K being adapted for engagement with a binding ring L which encircles the anti-friction rollers and turns with the same as the latter are rotated. Said ring L acts to draw or press the rollers K K toward each other, and to thereby carry the frames J J inwardly and thrust the rollers I I against the pulleys F F. The anti-friction rollers K being mounted on the sleeves i i obviously tend to turn with said backing rollers, as the latter revolve under the action of the friction pulleys with which they are in contact. The anti-friction rollers K, therefore, are turned or driven solely by frictional engagement of the sleeves i therewith, and the ring L turns or is driven solely by the contact of said anti-friction rollers with its inner contact surface. All rubbing or sliding friction between parts subject to the inward pressure of the binding or holding ring, is thereby entirely prevented when the two main friction pulleys are rotating at the same speed, and to a large extent prevented when the said pulleys are turning at different speeds; it being obvious that the anti-friction rollers turn at all times in the same direction as the backing rollers, and that when one backing roller is driven faster than the other, the anti-friction rollers will both turn at the same speed, which will be one intermediate to that of the backing-rollers, so that in any case there will be only a slight relative movement of the backing and anti-friction rollers producing friction between said anti-friction rollers and the sleeves i i on which they turn. The friction produced by the turning of the backing pulley on the studs $J^4 J^4$ will be but slight, as said studs carry only the weight of the said backing and anti-friction rollers.

In order to insure smooth and uniform movement in the ring L, internal guide rollers M and M' are provided in position to press upwardly and downwardly against the inner surface of the ring, said guide rollers being held in contact with the ring by spring pressure, and being free to move vertically, so that the ring may act by gravity on the rollers K K and thereby press or force the same together, it being obvious that the ring by reason of the convergence of its opposite sides above the horizontal central line thereof will operate with a wedge action to press or force the said rollers inwardly.

Devices for supporting the guide rollers are herein shown as follows: The upright bars N N are provided on their inner adjacent faces with guide grooves n' n' which are engaged by tongues or projections on the sides of two sliding plates $M^2 M^3$ in which the guide pulleys M and M' are respectively mounted. Said guide pulleys are drawn or pressed upwardly and downwardly against the ring by means of suitable springs O O, herein shown as placed around guide rods O' O' which extend between, and are engaged with, the plates $M^2$ and $M^3$, and which act on both plates to force the same apart. Said guide rods O' are here in shown as secured in the lower sliding plate $M^3$ and as having sliding engagement with the guide apertures in the upper sliding plate $M^2$, the springs O O being located between the upper sliding plate and nuts o o placed on said guide rods, said nuts being movable on the rods to adjust the tension of the spring. In a construction of this kind, it is obvious that so long as the sliding plates $M^2$ and $M^3$ are free to move in the guides, the weight thereof will rest on the lower part of the ring L, and inasmuch as this weight may in some instances act to force or press the ring downwardly with undue or unnecessary force, thereby causing too great pressure on the parts in contact, and undue friction, I propose to employ, if necessary, a spring $O^2$ which is applied in such a manner as to pull upwardly upon the lowermost plate $M^3$; the tension of said spring being made adjustable by suitable adjusting devices, so that more or less of the weight of the sliding plates and connecting parts may be allowed to come upon the ring as desired. Said spring $O^2$ is herein shown as consisting of a coiled wire attached at its upper end to a cross bar $N'$ and at its lower end to a clip $O^3$ which is secured to the plate $M^3$ by being placed beneath one of the nuts on the bolt or stud which forms the journal of the pulley $M'$. A turn buckle $O^4$ applied between the bar $N'$ and the upper end of the said spring, enables the tension of said spring to be easily adjusted.

I am aware that it has been proposed heretofore to employ in a speed changing and reversing device a construction embracing two pulleys having flat, opposing surfaces, one of which pulleys is driven by a belt and a shaft arranged between the pulleys and parallel with the flat faces thereof, and carrying sleeves provided with friction disks which engage the opposite flat faces of the pulleys, and also with gear wheels which intermesh with intermediate pinions on radial bearing studs attached to the shaft, together with power actuating devices by which longitudinal movement may be given to the said shaft for shifting the friction disks, said disk and gear wheels being driven in opposite directions by contact of the disks with the pulleys, and variation of the speed of the shaft being produced by shifting said shaft endwise so as to move both friction disks across the faces of the pulleys. A device embodying my invention has several advantages over that referred to. An important advantage is that in my invention the driving shaft, not being movable endwise, as is the case in the prior device referred to, may carry, or may be attached directly to, the part to be driven, so that the reversal of the driven part or change of speed thereof is accomplished merely by shifting or turning on its axis the friction disk, which may be easily done by hand and without the use of power actuating devices.

I am further aware of the speed changing device shown in patent to Hunt, No. 197,472, dated November 27, 1877, which shows two opposing disks having annular, concave, friction surfaces, and an intermediate friction pulley mounted to oscillate about an axis transverse to its axis of rotation. The device of said Hunt patent is, however, adapted solely for changing speed, the power being applied to one of said disks and taken from the other disk, and the intermediate friction pulley acting solely as a means of transmitting motion, and not as a driver, as is the case in my improved construction.

I claim as my invention—

1. A device for transmitting motion, comprising two oppositely rotating gear wheels, an intermediate gear wheel which is bodily movable about the center of rotation of said oppositely rotating gear wheels and intermeshes with the same, said intermediate gear wheel being mounted on a part which is connected with and gives motion to the part to be driven, two pulleys connected with and actuating said gear wheels, said pulleys having opposite, annular, friction surfaces, an intermediate driving pulley in contact at its opposite sides with the friction surfaces of both of said pulleys, said intermediate driving pulley being movable relatively to the main pulleys in such manner that when its point of contact is moved outwardly on one pulley it will be moved inwardly on the other pulley, and driving means attached to said driving pulley through the medium of connecting devices permitting movement of the said driving pulley relatively to the main pulleys, substantially as described.

2. A device for transmitting motion, comprising two oppositely rotating gear wheels, an intermediate bodily movable gear wheel intermeshing with both of said gear wheels first mentioned, said intermediate gear wheel being mounted on a rotating part connected with the part to be driven, two oppositely revolving friction pulleys which are connected with and give motion to the said oppositely rotating gear wheels, said friction pulleys having opposing, annular, concave, friction surfaces, a friction driving pulley mounted to oscillate about a pivotal axis transverse to its axis of rotation and engaging the annular friction surfaces of said oppositely rotating pulleys, and driving means connected with said friction driving pulley through the medium of devices permitting oscillatory movement of said driving pulley, substantially as described.

3. A device for transmitting motion, comprising two oppositely rotating pulleys having opposite, annular, concave, friction surfaces, a driving shaft from which motion is obtained, a driving pulley adapted to turn about a pivotal axis transverse to its axis of rotation, driving connections between said pulley and shaft permitting oscillatory movement of said pulley, and a part to be driven which is given motion through the medium of mechanical connections with both of said pulleys, so that by the shifting of the driving pulley about its transverse pivotal axis the part to be driven may be moved in either direction at a desired speed, substantially as described.

4. A device for transmitting motion, comprising two oppositely rotating pulleys having opposing, annular, concave, friction surfaces, a driving shaft from which motion is obtained, an oscillatory driving pulley engaged at its opposite sides with said friction surfaces and connected by a universal joint with said driving shaft, and a part to be driven which is given motion through the medium of mechanical connections with both of said oppositely rotating pulleys, whereby the oscillatory movement of the driving pulley will produce movement of the part to be driven in either direction at variable speed, substantially as described.

5. A device for transmitting motion, comprising two oppositely rotating gear wheels, an intermediate gear wheel which intermeshes with both of said gear wheels and is adapted to revolve bodily about the center of rotation of said gear wheels, said intermediate gear wheel being mounted on a rotating part connected with the part to be driven, two pulleys having opposing, annular, concave, friction surfaces, said pulleys having driving connection with the two gear wheels, an oscillatory driving pulley in frictional contact with both of said pulleys, a driving shaft by which motion is transmitted to the driving pulley, and a universal joint connecting the driving shaft with the said driving pulley, substantially as described.

6. A device for transmitting motion comprising a driving and a driven shaft, oppositely revolving gear wheels mounted centrically with the driven shaft, an intermediate gear pinion intermeshing with said oppositely rotating gear wheels, a bearing for said intermediate pinion rigidly attached to the driven shaft, friction pulleys mounted concentrically with the driven shaft and attached to said gear wheels, said friction pulleys being provided with opposing, annular, curved friction surfaces and an oscillatory driving pulley interposed between the friction surfaces of said pulleys and connected by a universal joint with the driving shaft, substantially as described.

7. The combination with oppositely rotating friction pulleys having opposing, annular, concave friction surfaces and an oscillatory driving pulley interposed between said friction surfaces, of a support for the said pulley comprising a swinging yoke on which the pulley is mounted and which is provided with a pivotal support in alignment with the axis of oscillation of the driving pulley, a driving shaft connected with said driving pulley by a universal joint, and a hand lever connected with the said yoke for actuating the same, substantially as described.

8. A device for transmitting motion comprising two friction pulleys mounted to rotate in opposite directions about a common central axis and having opposing, annular, concave friction surfaces, an oscillatory driving pulley interposed between said friction pulleys, backing pulleys bearing on the said friction pulleys opposite the driving pulley, said backing pulleys being bodily movable toward and from the frictional pulleys, and means for holding the backing pulleys in contact with the friction pulleys, substantially as described.

9. The combination, with oppositely revolving friction pulleys and an intermediate driving pulley engaging adjacent surfaces of both friction pulleys, of oppositely arranged backing pulleys engaging external surfaces of the friction pulleys, said backing pulleys being bodily movable toward and from the friction pulleys, and means for maintaining the backing pulleys in contact with the friction pulleys said means comprising anti-friction rollers mounted on sleeves attached to the backing rollers, and means engaging the anti-friction rollers to press the same inwardly, substantially as described.

10. The combination with oppositely revolving friction pulleys and an intermediate driving pulley engaging adjacent surfaces of both the friction pulleys, of oppositely arranged backing pulleys engaging external surfaces of the friction pulleys, said backing pulleys being bodily movable toward and from the friction pulleys, and means for maintaining the backing pulleys in contact with the friction pulleys said means comprising anti-friction rollers, and a holding ring embracing said anti-friction rollers, said anti-friction rollers being mounted centrally with and on sleeves attached to the backing rollers, substantially as described.

11. The combination with friction pulleys having opposing, annular friction surfaces and an intermediate driving pulley, or backing pulleys, laterally movable frames supporting said backing rollers, said frames being pivotally supported at one end, anti-friction rollers mounted on the backing rollers, a holding ring embracing said anti-friction rollers, and a horizontal guide bar for supporting the free ends of the said frames, substantially as described.

12. The combination with friction pulleys having opposing, annular friction surfaces and an intermediate driving pulley, of backing pulleys, movable supporting frames on which the same are mounted, anti-friction rollers mounted on the backing pulleys, a holding ring embracing said anti-friction rollers, and radially movable guide rollers engaging said ring between the anti-friction rollers, and springs thrusting said guide rollers outwardly into contact with said ring, substantially as described.

13. The combination with friction pulleys having opposing, annular friction surfaces and an intermediate driving pulley, of backing pulleys, movable supporting frames on which the same are mounted, anti-friction rollers mounted on said frame, a holding ring embracing said anti-friction rollers, radially movable guide rollers engaging said ring between the anti-friction rollers, movable supports for said guide rollers and stationary guides with which said supports are engaged, substantially as described.

14. The combination with friction pulleys having opposing, annular friction surfaces and an intermediate driving pulley, of backing pulleys, movable supporting frames on which the same are mounted, anti-friction rollers mounted on said backing pulleys, a holding ring embracing said anti-friction rollers, radially movable guide rollers engaging said ring between the anti-friction rollers, movable supports for said guide rollers, oppositely arranged sliding supports for said guide rollers, and springs acting on said supports to thrust the guide rollers toward the ring, substantially as described.

15. The combination with friction pulleys having opposing, annular friction surfaces and an intermediate driving pulley, of backing pulleys, movable supporting frames on which the same are mounted, anti-friction rollers mounted on the said frame, a holding ring embracing said anti-friction rollers, radially movable guide rollers engaging said ring between the anti-friction rollers, movable supports for said guide rollers, oppositely arranged sliding supports for said guide rollers, springs acting on said supports to thrust the guide rollers toward the ring, and a spring applied to sustain the weight of said guide rollers and their supports, substantially as described.

In testimony that I claim the foregoing as my invention I affix my signature in presence of two witnesses.

THADDEUS W. HEERMANS.

Witnesses:
C. CLARENCE POOLE,
WM. L. HALL.